United States Patent [19]

Baillie

[11] Patent Number: 4,903,976
[45] Date of Patent: Feb. 27, 1990

[54] LOCKING MECHANISM FOR SELF STEERING SEMI-TRAILER

[75] Inventor: Lloyd A. Baillie, Plano, Tex.

[73] Assignee: Atlantic Richfield Company, Los Angeles, Calif.

[21] Appl. No.: 199,544

[22] Filed: May 27, 1988

[51] Int. Cl.⁴ ............................................. B26D 13/02
[52] U.S. Cl. ..................................... 280/426; 280/442
[58] Field of Search ............... 280/442, 445, 419, 426, 280/81 A

[56] References Cited

U.S. PATENT DOCUMENTS 4,702,488 10/1987 Baillie .................................. 280/426
4,759,563 7/1988 Nash .................................... 280/426

FOREIGN PATENT DOCUMENTS 3031620 3/1981 Fed. Rep. of Germany ...... 280/419

Primary Examiner—Charles A. Marmor
Assistant Examiner—Richard Camby
Attorney, Agent, or Firm—Michael E. Martin

[57] ABSTRACT

A tractor-trailer unit with a self steering semi-trailer characterized by a steerable bogie assembly includes elongated cables connected to the bogie assembly by way of a rotatable pulley, the cables being moved in response to a cam and lever arrangement, and a pair of opposed locking levers which are responsive to slack in one or the other of the cables to engage the pulley to prevent further turning movement of the bogie assembly in the direction of the slack cable. The pulley includes a set of circumferentially spaced apart pins which engage the respective locking members in an escapement action to allow the steerable bogie to be turned back toward a centered or aligned position with the trailer frame if one or both cable traces become slack.

6 Claims, 2 Drawing Sheets

LOCKING MECHANISM FOR SELF STEERING SEMI-TRAILER

BACKGROUND OF THE INVENTION

1. Field of the Invention

The present invention pertains to a locking mechanism for a semi-trailer having a self steering rear wheel axle or bogie assembly to prevent uncontrolled pivoting of the bogie relative to the trailer frame.

2. Background

The present invention pertains to an improvement in the steering system for tractor-trailer units of the general type described in my U.S. Pat. No. 4,702,488 which is assigned to the assignee of the present invention. The above-mentioned patent pertains to a steering system for a tractor-trailer unit wherein the semi-trailer is provided with a rear wheel axle assembly or bogie which is controlled by a self steering mechanism to minimize the effort to turn relatively sharp corners with the tractor-trailer unit. The subject matter of U.S. Pat. No. 4,702,488 is incorporated herein by reference.

One problem which may arise with a self steering system of the type described in the above-mentioned patent is in the event of breakage of one of the steering cables or a similar failure which might cause loss of control of steering of the trailer bogie assembly. The present invention provides a unique mechanism adapted for locking the pivotable rear wheel bogie assembly of a semi-trailer steering mechanism of the general type described in the above-referenced patent to minimize loss of steering control.

SUMMARY OF THE INVENTION

The present invention provides a locking mechanism for preventing unwanted turning of a pivotable rear wheel bogie assembly for a semi-trailer having a self steering mechanism operable by flexible cables or the like. In accordance with one aspect of the present invention, a self steering mechanism for a semi-trailer is provided with a generally cylindrical pulley around which is trained a steering cable which is operated by a cam follower mechanism associated with a tractor "fifth wheel" cam and wherein the steering cables are trained over idler pulleys which are connected to means for preventing turning of the pulley and rear wheel bogie in the direction of the cable member which has failed, is no longer operable to effect steering action or has become excessively slack.

In accordance with another aspect of the present invention, there is provided a mechanism for positioning the pivotable rear bogie of a semi-trailer in a straight ahead or aligned position with the trailer frame in the event of failure of the steering cable mechanism so that the trailer may be hauled along a roadway in a conventional fixed and aligned position of the bogie with respect to the trailer frame.

Those skilled in the art will further appreciate the advantages and unique features of the present invention upon reading the detailed description which follows in conjunction with the drawing.

DESCRIPTION OF A PREFERRED EMBODIMENT

Figure 1:
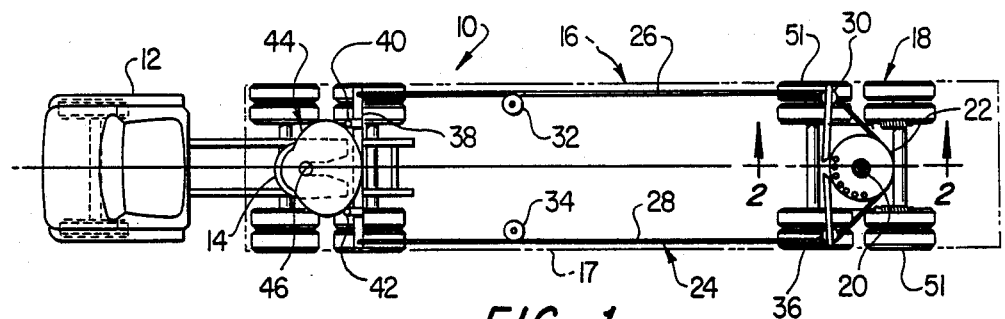
FIG. 1 is plan view of a tractor-trailer unit including a semi-trailer self steering system and associated locking mechanism in accordance with the present invention.

In the description which follows like parts are marked throughout the specification and drawing with the same reference numerals, respectively. The drawing figures are not necessarily to scale and certain elements may be shown in somewhat exaggerated scale or schematic form in the interest of clarity.

Referring to FIG. 1, there is illustrated a plan view of an over-the-road tractor-trailer unit, generally designated by the numeral 10. The tractor-trailer unit 10 includes a conventional tractor 12 having a so-called "fifth wheel" semi-trailer connecting and support member 14 mounted thereon. The tractor-trailor unit 10 also includes a semi-trailer 16 having a steerable rear wheel assembly or bogie 18 which is mounted for pivotal movement about a pivot axis 20. The bogie 18 is connected to a rotatable pulley member 22 which will be described in further detail herein and around which is trained a flexible cable 24. The cable 24 is suitably secured to the pulley 22 in nonslipping relationship thereto and opposed traces 26 and 28 of the cable 24 are trained along opposite sides of the trailer frame 17 and pass over respective idler pulleys 30, 32, 34 and 36. The cable traces 26 and 28 are connected to a pivotally mounted cam lever 38 supported at the forward end of the trailer frame 17 and including opposed lever arms having cam followers 40 and 42 mounted thereon. The cam followers 40 and 42 are engageable with a cam 44 disposed for pivotal movement about the pivot axis of a trailer hitch or kingpin 46. Further details of the features of the cam 44 and the pivotally supported lever 38 are described in U.S. Pat. No. 4,702,488. Suffice it to say that the cable traces 26 and 28 are maintained under at least slight tension sufficient to remove any slack therefrom at all times and are subject to turning movements of the cam 44 and the responsive pivotal movement of the lever 38 to effect turning movements of the bogie 18 relative to the trailer frame 17 to enhance the maneuverability of the tractor-trailer unit 10.

Figure 2:
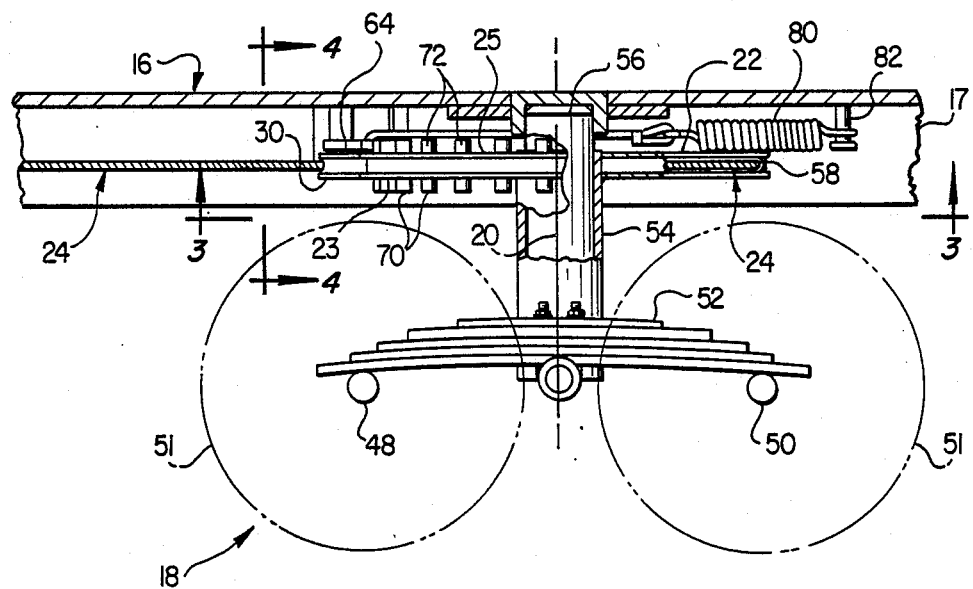
FIG. 2 is a view taken generally along the line 2—2 of FIG. 1.

Referring now to FIG. 2 also, the bogie 18 includes spaced apart axle assemblies 48 and 50 on which are mounted suitable rubber tired wheels 51. The axle assemblies 48 and 50 are interconnected by spring assemblies 52, one shown in FIG. 2, which are suitably secured to a central pivot member 54. The pivot member 54 journals and is pivotal on a depending bearing pin 56 secured to the frame 17. As illustrated in FIG. 2, the pulley 22 is suitably secured to the member 54 for pivotal movement therewith about the axis 20. Accordingly, the pivot member 54 and axle assemblies 48 and 50 may pivot about the axis 20 in response to turning of the pulley 22. The cable 24 is trained over the pulley 22 in a sufficient number of turns to not be slidable relative to the pulley or is suitably secured to the pulley by clamp means 58, FIG. 2.

Figure 4:
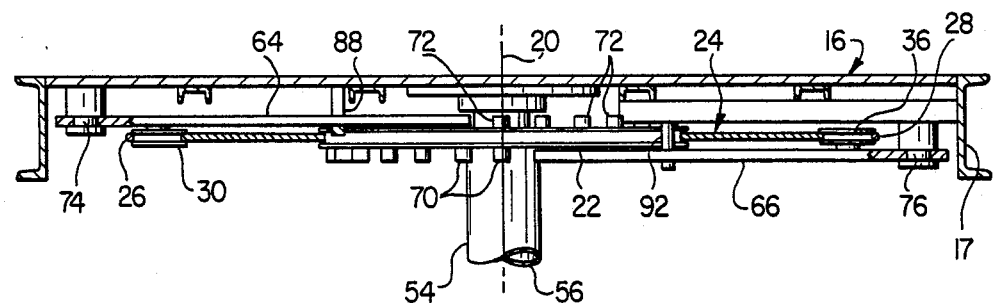
FIG. 4 is a view taken generally from the line 4—4 of FIG. 2.
Figure 3:
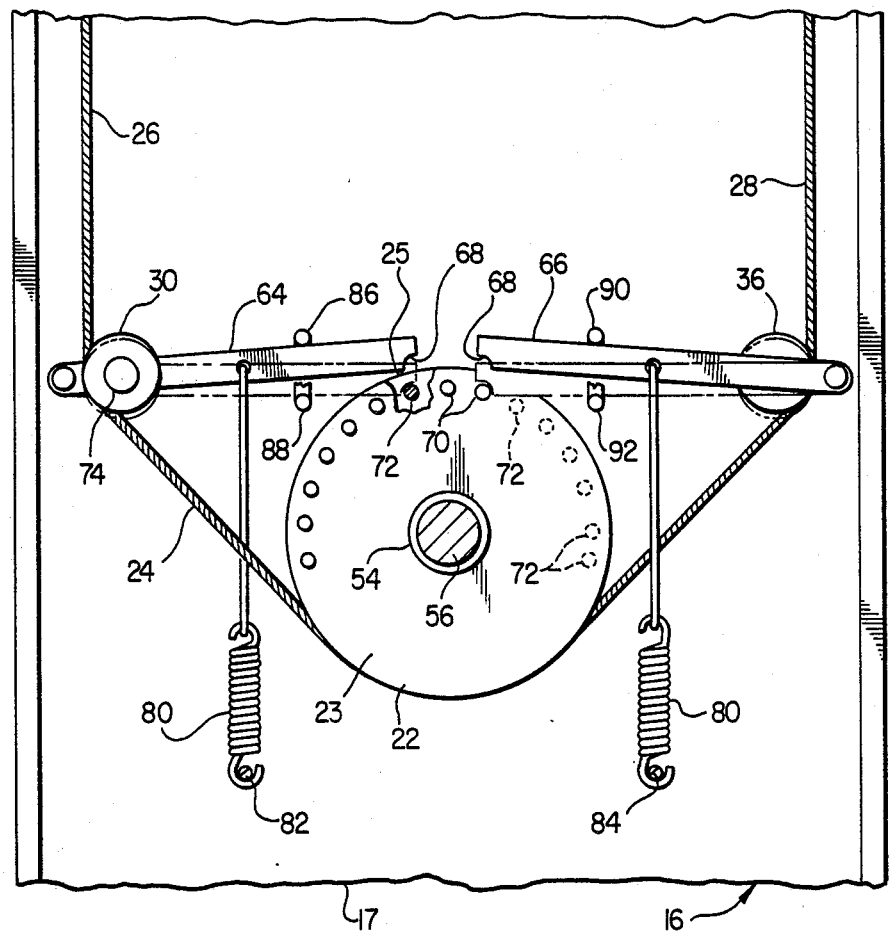
FIG. 3 is a view taken generally from the line 3—3 of FIG. 2.

Referring now to FIGS. 3 and 4 also, the idler pulleys 30 and 36 are mounted on respective pivotally supported locking arms 64 and 66, which each have a cam surface or notch 68 formed thereon and engageable with respective ones of a series of circumferentially spaced apart locking pins 70 and 72 supported so as to extend from the opposite side plates 23 and 25 of the pulley 22. As shown in FIG. 4, the locking arms 64 and 66 are supported for pivotal movement on depending pivot pins 74 and 76, respectively, which are supported by the trailer frame 17. Each of the locking arms 64 and 66 is also suitably secured to springs 80, see FIG. 3, which are respectively anchored to the trailer frame 17 at anchor points 82 and 84. The springs 80 are connected to the arms 64 and 66 in such a way as to bias the arms to pivot toward engagement of the pins 70 and 72, respectively, but this biasing force is opposed by tension in the cable 24 which tends to bias the arms into a retracted position, shown by the solid lines of FIG. 3, clear of the locking pins 70 and 72 so that the pulley 22 is free to rotate in response to movement of the cable traces 26 and 28. Pivotal movement of the arms 64 and 66 is limited by opposed stop members 86 and 88 for the arm 64 and similar stop members 90 and 92 for the arm 66.

In normal operation of the steering system for the tractor-trailer unit 10, the arms 64 and 66 are biased against the respective stops 86 and 90 and clear of engagement with the locking pins 70 and 72 so that the pulley 22 may respond to movement of the cable traces 26 and 28 to effect the desired steering of the bogie 18. However, if slack should occur in either of the cable traces 26 or 28 as a result of cable breakage or malfunction of the mechanism associated with the cam 44 and cam lever 42, the locking arm which was previously urged into its retracted position by the cable which is now slack will pivot in response to urging of spring 80 into engagement with the locking pins to prevent uncontrolled turning of the bogie 18 any further in the direction of the failed or slack cable.

Viewing FIG. 3, the locking arm 66 can prevent clockwise rotation of the pulley 22 only if the pulley is turned to the right of center, since the row of pins 70 stops at the position corresponding to normal, straight forward orientation of the bogie 18. Similarly, locking arm 64 can prevent counterclockwise rotation of the pulley 22, viewing FIG. 3, only if it is turned left of center, since it engages one of the pins 72 which terminate at a position corresponding to normal, straight forward orientation of the bogie 18. If both locking arms 64 and 66 are moved to their pin engaging positions with the bogie 18 in a position with the wheels 51 turned with respect to the length of the trailer frame 17, the bogie may be restored to a position wherein its wheels are in alignment with the trailer frame by pivoting the trailer frame from left to right relative to the bogie. The relationship of the locking arms 64 and 66 with respect to their respective sets of stop pins 70 and 72 will permit movement of the bogie 18 back to its normal, wheels parallel to the trailer frame position whereupon each of the locking arms will engage the end pin, respectively, in the arcuate rows of pins to hold the bogie in a position with its wheels aligned with or parallel to the trailer frame position, and hold it there.

It should be noted that neither locking arm can act to turn the bogie 18 away from its centered position. Even is the locking arms 64 and 66 should accidentally engage while the bogie steering mechanism is operating, they could not hold the bogie in any pivotal attitude not permitted by the regular steering mechanism. The locking arms 64 and 66 would, however, overrule the bogie steering mechanism, and convert the trailer into a conventional fixed bogie type trailer.

As illustrated in FIG. 3, the pins 70 preferably extend over an arc, with respect to the axis 20, which would ensure engagement of the pins by the arm 66 over the maximum range of turning of the pulley 22 in one direction and the circumferential spacing of the pins 72 is such as to cover the maximum arc of turning of the pulley in the opposite direction.

The foregoing description of the apparatus and its operation are believed to be sufficient to enable one of ordinary skill in the art to practice the present invention. The apparatus may be constructed using conventional engineering materials for automotive vehicles and components thereof. Although a preferred embodiment of the invention has been described in detail herein, those skilled in the art will also appreciate that various substitutions and modifications may be made to the invention without departing from the scope and spirit thereof as set forth in the appended claims.

What I claim is:

1. In a system for controlling the turning of a semi-trailer of a tractor-trailer unit relative to the tractor, said trailer including a frame and a rear wheel bogie assembly supported for pivotable movement about a generally vertical pivot axis relative to said frame, elongated cable means for turning said bogie to steer said trailer, said cable means including opposed cable traces extending along said frame and connected to said bogie, the improvement comprising:

means for preventing turning of said bogie with respect to said frame in at least one direction in response to a predetermined degree of slack in at least one of said cable traces.

2. The system set forth in claim 1 wherein:

said bogie includes pulley means connected to said cable means and said means for preventing turning of said bogie includes means engageable with said pulley means for preventing rotation of said pulley means and said bogie in the direction of the cable trace which has said predetermined degree of slack.

3. The system set forth in claim 1 wherein:

said cable traces are trained over respective idler pulleys, each of said idler pulleys is connected to a locking member, each of said locking members being movable in one direction under a predetermined tension in the cable trace trained over said idler pulley associated with said locking member, respectively, and each of said locking members being movable in a direction opposite to said one direction.

4. The system set forth in claim 3 wherein:

said pulley means includes spaced apart means for engaging said locking members, respectively, in response to movement of said locking members in said opposite direction, respectively.

5. In a system for steering a bogie of a semi-trailer in response to turning movement of a tractor connected to and pulling said semi-trailer, a steerable bogie, a trailer frame supported by said bogie, a pivot connection formed between said bogie and said trailer frame, means for steering said bogie including opposed elongated steering members and means for locking said bogie in a predetermined pivotal position with respect to said trailer frame in response to a predetermined change in tension in said elongated steering members, respectively, said means for locking including members engageable with said elongated steering members, respectively, and spaced apart means on said bogie and engageable with said means engageable with said elongated steering members, respectively, to prevent turning movement of said bogie further in the direction of said elongated steering member which has undergone said predetermined change in tension.

6. In a system for steering a bogie of a semi-trailer in response to turning movements of a tractor pulling and semi-trailer, a steerable bogie including rotatable trailer wheels, a trailer frame supported by said bogie, a pivot connection between said bogie and said trailer frame, steering mechanism for said bogie for pivoting said bogie with respect to said trailer frame, and locking means for locking said bogie in a position with said wheels aligned with said trailer frame, said locking means including a plurality of circumferentially spaced apart stop pins disposed on said bogie and a pair of opposed locking arms mounted on said trailer frame and movable, respectively, to engage respective ones of said stop pins successively and in such a way as to permit pivotal movement of said bogie from a position of said wheels out of alignment with said trailer frame to a position to align said wheels with said trailer frame and to prevent further movement of said bogie of a position of said wheels out of alignment with said trailer frame.

* * * * *